Feb. 13, 1962 H. HORGEN 3,020,706
CONTROL MEANS FOR FREE-PISTON OR SEMI-FREE PISTON ENGINES
Filed Nov. 28, 1958 5 Sheets-Sheet 2

INVENTOR
HELGE HORGEN
BY
Bailey, Stephens & Huettig
ATTORNEYS

Fig. 7.

Feb. 13, 1962 H. HORGEN 3,020,706
CONTROL MEANS FOR FREE-PISTON OR SEMI-FREE PISTON ENGINES
Filed Nov. 28, 1958 5 Sheets-Sheet 4

INVENTOR
HELGE HORGEN
BY
Bailey, Stephens & Huettig
ATTORNEYS

Feb. 13, 1962   H. HORGEN   3,020,706
CONTROL MEANS FOR FREE-PISTON OR SEMI-FREE PISTON ENGINES
Filed Nov. 28, 1958   5 Sheets-Sheet 5

INVENTOR
HELGE HORGEN
BY
Bailey, Stephens & Huettig
ATTORNEYS

United States Patent Office 3,020,706
Patented Feb. 13, 1962

3,020,706
CONTROL MEANS FOR FREE-PISTON OR
SEMI-FREE PISTON ENGINES
Helge Horgen, Lyon, France, assignor to Societe d'Etudes
et de Participations Eau, Gaz, Electricite Energie S.A.,
Geneva, Switzerland, a society of Switzerland
Filed Nov. 28, 1958, Ser. No. 777,056
Claims priority, application France Dec. 3, 1957
9 Claims. (Cl. 60—13)

The invention relates to installations of the kind comprising at least one free-piston or semi-free-piston engine, and it concerns more particularly but not exclusively installations of this kind in which the free-piston or semi-free-piston is a gas-generator supplying a hot, power gas under pressure, preferably for driving a gas turbine.

A semi-free-piston engine is an engine which operates in the same way as a free-piston engine at moderate loads, a crank and connecting rod mechanism being provided which does not prevent variations in stroke of the piston with variations in load. At higher values of load, however, the said mechanism operates to prevent the outward movement of the piston from exceeding a predetermined limit. In the case where the engine has two pistons moving in opposite directions, the crank and connecting rod mechanism serves, at moderate loads, to synchronise the movements of the two pistons in the manner usual in free-piston engines.

The invention has for its principal object to provide means for varying, within certain limits, either at will or automatically, cyclic speed, that is the number of strokes in unit time, of the piston or pistons of the engines, such variation in the cyclic speed serving either to regulate the supply of power gas or to re-establish, in an installation comprising a plurality of gas-generators or other free-piston engines, a predetermined phase-relationship between the gas-generators when the desired phase-relationship has been disturbed by some cause or other, the modification in the cyclic speed being, in this latter case, only temporary.

According to the present invention there is provided an installation comprising at least one free-piston or semi-free-piston engine having a combustion piston operating in a combustion cylinder and connected to a compressor piston operating in a compressor cylinder, the part of the latter cylinder on one side of the compressor piston constituting a cylinder from which power gas is delivered to a reservoir, and the part on the other side of the compressor piston constituting a cushion which stores energy during the combustion stroke and returns the stored energy to the pistons on the compression stroke of the combustion piston, the installation further comprising a stabiliser arranged to control the quantity of air in the cushion and thereby to vary the cyclic speed of the pistons under the influence of a pressure pulse derived from a chamber of the engine whose pressure varies periodically, and correcting means controlled independently of the movements of the pistons for varying the time in the cycle of pressure change within the said chamber at which the said pressure pulse is derived.

The engine or each of the engines may be a gas-generator, the reservoir being the scavenge-air reservoir, usually the engine-case of the engine. The chamber from which the pressure pulse is derived is preferably the cushion.

The invention will be described, by way of example, with reference to the accompanying drawings in which—

FIG. 10 shows the electrical connections of the device shown diagrammatically in FIG. 8, and FIGS. 11 and 12 show the angular distribution of the contacts round a rotary control device for an installation comprising six gas-generators, respectively for the case where all the gas-generators are in operation and for the case where five only of the gas-generators are in operation.

Figure 1:
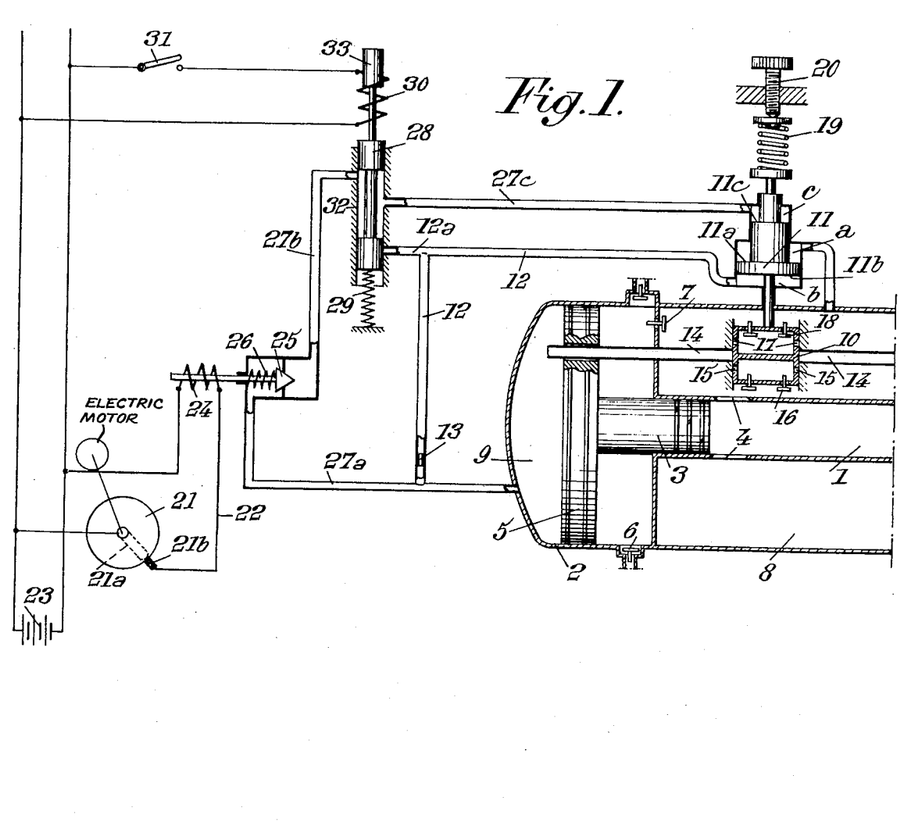
FIG. 1 shows diagrammatically half a gas-generator having opposed free pistons, with its regulating device and with means adapted to vary, at least temporarily, the cyclic speed of the said gas-generator.

The gas-generator or generators forming part of the installation to be described with reference to FIG. 1 are preferably of the type having opposed free pistons. There are thus arranged on either side of a combustion cylinder 1, two compressor cylinders 2 (of which only one, situated on the left-hand side of the engine, is shown in FIG. 1), and in the combustion cylinder 1, two combustion pistons 3 (only one of which is shown in FIG. 1) are caused to operate so that they move in opposite directions in the combustion cylinder, the movements being generally synchronised by a synchronising device, not shown. One of the combustion pistons 3, for example the one on the left-hand side of the engine, controls the inlet ports 4 of the combustion cylinder, while the oher combustion piston 3 (not shown) controls the exhaust ports (not shown), which are connected to a machine, such as a turbine, to be driven by the hot power gases leaving the latter ports.

Each of the combustion pistons 3 is integral with a compressor piston 5 operating in one of the compressor cylinders 2 and dividing the latter into two parts, of which one, for example that nearer the combustion cylinder 1, performs the function of a compressor cylinder and is provided, for that purpose, with air inlet valves 6 and air delivery valves 7, permitting the transfer of the compressed air into the engine-case 8 surrounding the combustion cylinder 1, while the chamber on the opposite side of each piston 5 forms a pneumatic return energy accumulator 9 (hereinafter called a "cushion").

The combustion cylinder 1 is, of course, also provided with one or more fuel injectors, not shown, and the whole of the driving part of this gas-generator advantageously operates on the diesel principle with a two-stroke cycle.

It is known that not only the pressure of the power gases supplied by such a gas-generator, but also their delivery, are variable within wide limits in order to satisfy the operating conditions of a turbine working under variable loads. To ensure the stability of operation of the gas-generator, the mass of air in the cushion 9 must be adapted to the working conditions of the gas-generator, and for this purpose, use is made of a device called a "stabilizer." The stabilizer, denoted in FIG. 1 by 10, is controlled on the one hand in dependence upon the working pressure of the gas-generator, that is to say, in dependence upon the pressure at which the power gases leave the cylinder 1, or in dependence upon the pressure prevailing in the engine-case 8 which is closely related to the aforesaid working pressure, and, on the other hand, in dependence upon the characteristic pressure of the cushion 9, which characteristic pressure may be the mean pressure or a sampled pressure taken from the cushion at the moment when the piston 5 is in a predetermined position. The stabilizer is for this purpose connected to a stepped piston 11, whereof one of the faces 11a is exposed, for example, to the action of the pressures prevailing in the engine-case 8 and whereof another face 11b is exposed to the action of the mean pressure prevailing in the cushion 9, the latter pressure being applied to the face 11b through a pipe 12 including a calibrated or very small-size orifice 13, which renders the piston 11 insensitive to the differences between the momentary values of the pressures prevailing in the cushion 9 and their mean value.

The stabilizer 10 operates in such a manner that when the working pressure diminishes and consequently the stabilizer 10 moves upwardly, a portion of the air situated in each of the cushions escapes from the latter to re-enter the casing 8 through the ducts 14, the openings 15 provided in the stabilizer and brought opposite the ducts 14 by said upward movement of the stabilizer, and finally the valves 16 of the stabilizer, while for an increase in working pressure, bringing the openings 17 of the stabilizer opposite the ducts 14, the air from the casing 8 passes through the valves 18 of the stabilizer, the openings 17 and ducts 14, into the cushions 9, thereby increasing the mass of air situated therein.

It should be noted that a return spring 19 also acts on the stepped piston 11, the compression of this spring being preferably adjustable, for example by means of a screw 20.

Instead of causing the mean pressure of the cushion to act on the face 11b of the stabilizer, it may be arranged that this face is acted on by the pressure prevailing momentarily in the interior of the cushion 9 when the piston 5 is in a predetermined position in the cylinder 2. By causing the aforesaid pressures to act on the stabilizer without intervention from the outside, that is to say according to the natural course of the variations of the working pressure, which variations are obtained by the automatic regulating device of the gas-generator, and if no unforeseen disturbing effect intervenes, a cyclic speed of the free pistons is obtained which will be referred to hereinafter as "natural stroke frequency." In principle, this frequency varies only when the working pressure varies.

In order, however, to cause the natural stroke frequency of the gas-generator to vary between certain limits, in accordance with the invention, there is allowed to act on the stabilizer 10 a further pressure, likewise taken from the cushion 9. The moment of extracting this further pressure is, however, not connected to a fixed position of the piston 5 in the cushion, but is determined by a member not subjected to the movements of the free piston.

There is thus provided on the stepped piston 11 controlling the stabilizer 10, an additional step working in a chamber c and forming an active face 11c, on which is caused to act the pressure taken from the cushion 9 at a moment determined by a periodically acting control member 21, the movement of which may be rotary, oscillatory, or of other nature. In the constructional forms shown, this member has the form of a rotating electric commutator or contactor 21 driven by an electric motor or other appropriate means at a speed which can be maintained at a constant value which is preferably variable. Said contactor is connected in an electric circuit 22 comprising also, in series with the contactor 21, a source of current, for example a battery 23 and a coil 24. This coil, when energised by an electric current, serves to open a valve 25 urged to its closed position by a spring 26 and controlling a pipeline 27a, 27b, 27c connecting the cushion 9 to the chamber c, in which moves the face 11c of the piston 11. Each time the contactor 21, during its rotation, closes the circuit 22 by means of an arm 21a and a fixed contact 21b, the valve is opened for an instant and allows a pressure pulse to pass from the cushion 9 to the chamber c.

If the pressure pulse admitted to the chamber c each time the contactor 21 opens the valve 25, is equal to a predetermined pressure, which is for example equal to the mean pressure in the cushion 9, the strokes of the free piston retain their natural frequency, and this situation is maintained as long as the speed of rotation of the switch corresponds to this natural stroke frequency.

The pressure admitted to the chamber c may, however, have a value different from that of the aforesaid predetermined pressure owing either to (a) a variation in the stroke frequency of the piston, which differs more or less from its natural value owing to a disturbing effect, or (b) a variation in the speed imparted to the rotary contactor 21.

In either case the pressure variation in the chamber c has a modifying effect on the cyclic speed of the pistons of the gas-generator. This modifying effect is arranged to act in such a way that each time there is a difference between the cyclic speed of the gas-generator pistons and that of the rotary contactor, the cyclic speed is corrected so as to become equal again to that of the contactor. Consequently, if the cyclic speed lags relatively to the rotation of the contactor, it is necessary to accelerate the pistons, and if they lead, they must be retarded.

In the constructional form represented by FIG. 1, the pressure in chamber c on the face 11c acts in the same sense on the stepped piston 11 as the working pressure in the chamber a on the face 11a. It is therefore necessary, for a decrease in the cyclic speed relatively to the contractor, that the pressure in the chamber c should increase, and for an increase in the cyclic speed, the pressure in the chamber c should diminish. For this reason, the opening of the valve 25 should occur when the pistons are moving inwardly (during which stroke there is expansion of the cushion). The opposite should take place if the pressure in the chamber c acting on the piston 11 is the same sense as the characteristic pressure of the cushion acting in the chamber b on the face 11b.

Figures 2, 3:
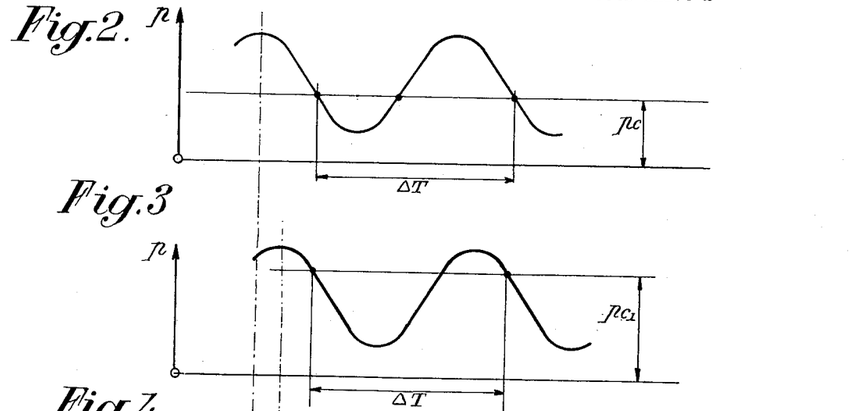
FIGS. 2 to 6 are five diagrams for facilitating the understanding of the invention.
Figures 4, 5, 6:
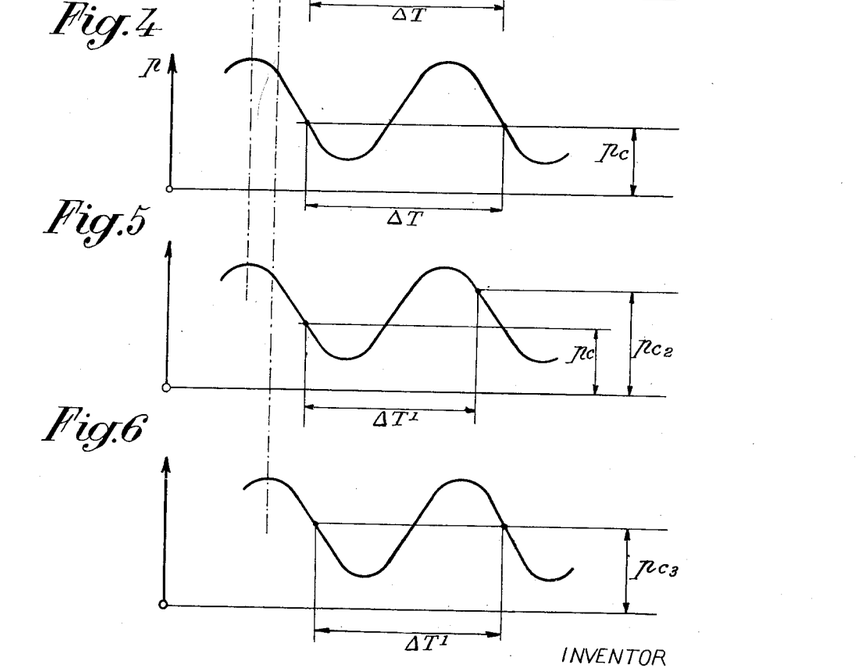

The diagrams of FIGS. 2 to 4 illustrate the case where the generator is temporarily out of phase relatively to the control device 21, due to a fortuitous drop in speed. These diagrams show the variation of the pressure $p$ in the cushion as a function of time. The time between two consecutive openings of the valve 25 is indicated by $\Delta T$. The diagram of FIG. 2 corresponds to the equilibrium case, where the pressure $p_c$ taken each time from the cushion by the opening of the valve 25 ensures for each stroke of the pistons likewise a duration equal to $\Delta T$, thus ensuring at the same time a definite phase relationship relatively to the rotation of the control member.

If now for some fortuitous reason, the cyclic speed diminishes, the curve indicating the variation of pressure in the cushion as a function of time is shifted relatively to the moments at which the control member operates to take pressure from the cushion, and the sampled pressures have for example the value $p_{c1} > p_c$ (see FIG. 3). Due to the increase in the instantaneous pressure, the gas-generator is accelerated until the previous situation is re-established (see FIG. 4) both in regard to the cyclic speed and in regard to the phasing of the gas-generator relatively to the control device.

For the diagrams of FIGS. 2 to 4, it has been assumed that the control member rotates at a constant speed, imposing on the free-piston engine also a constant speed and a definite phase difference. If the speed of the control member is varied, for example if it is accelerated, the mode of operation illustrated by FIGS. 5 and 6 is obtained, where $\Delta T^1 < \Delta T$. Owing to the acceleration of the control member, the sampled pressure first has the value $p_{c2}$, which accelerates the gas-generator so that it will overtake the control member. A new state of equilibrium then follows, with a sampled pressure $p_{c3}$ less than $p_{c2}$ but greater than $p_c$, the effect of which is that the cyclic speed corresponds to the increased speed of the control member, the phasing between this member and the gas-generator corresponding to this new state.

Everything which has been set forth in the foregoing applies equally well to installations comprising only one free-piston engine as to installations comprising a plurality of such engines. In this latter application, the invention makes it possible in a particularly simple manner to maintain a pre-determined phase difference between the various engines (gas-generators) of the installation. For this purpose, it is merely necessary to employ a single rotary control member and to distribute around this member as many fixed contacts as there are free-piston engines to control, the angular position of these contacts relatively to said control member providing the desired phase difference between the engines.

Figure 7:
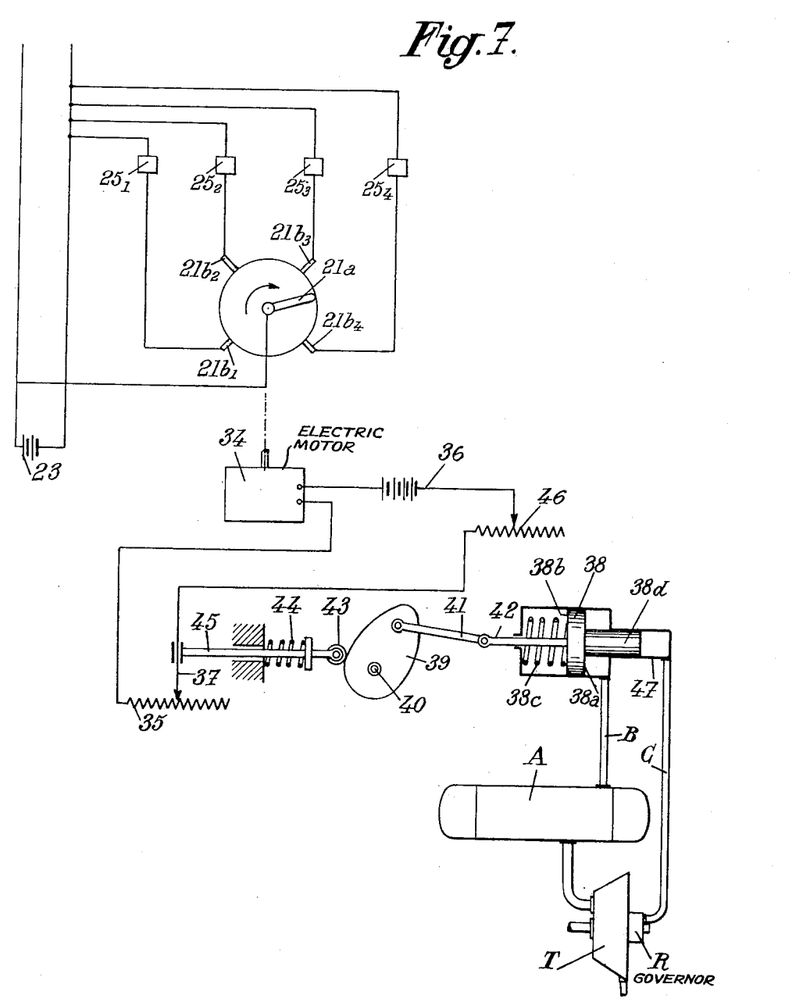
FIG. 7 shows a device for maintaining a predetermined phase displacement and regulating the cyclic speed of four gas-generators forming part of an installation according to the invention.

Thus, in an installation with four gas-generators which have to work with a phase difference of 90° from one to the next, a rotating contactor 21, as shown in FIG. 7, has as many fixed contacts $21b_1$, $21b_2$, $21b_3$ and $21b_4$ arranged around it as there are gas-generators, each fixed contact being offset angularly by 90° relatively to the adjacent fixed contacts. Each of the fixed contacts is connected to one of the valves $25_1$, $25_2$, $25_3$ and $25_4$ of the various gas-generators (not shown in FIG. 7).

Another great advantage of the invention resides in the possibility of varying the phase difference between the various gas-generators by simple modification of the angular position of the fixed contacts relatively to the rotating contactor. In an installation having a plurality of gas-generators, in which the number of gas-generators in operation may be changed, it thus becomes easy to obtain the best phase difference for the gas-generators at any time in operation. There will be described hereinafter a device constructed in accordance with the invention whereby the angular position of the fixed contacts corresponding to the gas-generators in operation may be varied in such a manner that the optimum phase difference is obtained automatically for each number of gas-generators in operation.

In certain cases, it is expedient to put out of operation the valve 25 by which the control member 21 applied the pressure taken from the cushion 9 to the cylinder 11c. This is more particularly the case when, in an installation having a plurality of gas-generators, one or other of these gas-generators has to be started after having been stopped, while the other gas-generators of the same installation continue to work. In this case, it is first of all necessary to allow the gas-generator which has to be started to run at its natural frequency until its working pressure reaches that of the other gas-generators, which is the condition for connecting the gas-generator which has been started to the common manifold fed by all the gas-generators in operation.

In order to be able to withdraw any one of the gas-generators from the control effect of member 21, various means may be provided. It appears particularly advantageous, however, to have recourse to that shown in FIG. 1 and according to which there is provided a distributor 28, controlled for example on the one hand by a spring 29 and, on the other hand, by a coil 30, the circuit of which can be closed by a switch 31. While no current is passing through the coil 30, the spring 29 maintains the distributor 28 in the position shown in FIG. 1, in which the distributor provides the connection between the sections of the pipelines 27b and 27c, and closes a pipeline section 12a connecting the pipeline 12 to the cylinder 32 in which the distributor 28 operates. When the switch 31 is closed, on the contrary, the coil 30 by the pull which it exercises on the armature 33 integral with the slide valve 28, moves the latter downwardly, so that communication between the sections 27b and 27c is interrupted and on the other hand, the pipeline section 12a is put into communication with the pipeline section 27c. From that moment, it is the mean pressure of the cushion 9 which is transmitted to the chamber 11c and the gas-generator operates at its natural frequency.

It has already been explained in the foregoing that the speed of rotation of the control member 21 determines the cyclic speed of the pistons of the gas-generator or generators controlled by that member, provided that the speed imposed on the gas-generators by the control member does not differ too much from their natural frequency. On the other hand, it is known that the natural frequency of a free-piston gas-generator increases when the working pressure increases, and conversely diminishes when the working pressure diminishes. Consequently, when the free-piston engines subjected to a control member of the type under consideration are gas-generators with variable working pressure, according to an advantageous constructional form of the invention, the speed of the control member is so varied as a function of the working pressure, as to obviate excessive differences between the speed of said member and the natural frequency of the gas-generator or gas-generators. It is thus possible, when the control member 21 is rotated by an electric motor 34 (see FIG. 7) to vary the speed of the motor as a function of the working pressure of the gas-generator or generators. To obtain this variation of the speed of the motor 34, any appropriate means may be employed. Advantageously, a variable excitation resistance 35 is used, which is connected in the circuit 36 of the motor 34, and the value of which can be varied by means of a sliding contact 37, controlled for example by a piston 38, on one of the faces 38a of which acts the working pressure supplied by a pipe B from the gas-generator A or gas-generators (if the installation possesses a plurality thereof), and on the other face 38b of which acts a compression spring 38c. Preferably, the movements of the piston 38 under the action of the working pressure are not transmitted directly to the sliding contact 37, but pass to the latter via a cam 39 rotating on a shaft 40. This cam, on the one hand, is connected by a rod 41 to the rod 42 of the piston 38, and on the other hand, acts on a roller 43 which is urged by a spring 44 towards the surface of the cam 39 and connected to the sliding contact 37 by a rod 45. Preferably, there is also included in the circuit 36 of the motor 34 and in series with the resistance 35, a second resistance 46, which is likewise variable, for example by hand. By means of this latter resistance, it is possible to vary when desired the speed of the gas-generator or of all the gas-generators in operation, for example for obtaining an increase in the delivery of power gases under full load or a reduction in fuel consumption when operating on no-load conditions.

In an installation comprising one or more gas-generators having variable pressure and delivery, and a gas turbine fed by the power gases supplied by the gas-generator or gas-generators, the working pressure of these gas-generators depends substantially upon the load of the turbine T. In view of the fact that the regulating pulses coming from the governor R of the turbine and transmitted to the gas-generator or gas-generators A cause the working pressure to rise or fall with a certain lag, it is advantageous to allow to act on the aforesaid piston not only the working pressure, but also, directly, as correcting pulse, a pressure pulse from the governor R, which already notifies the modification in working pressure which will occur a short time later. For this reason, in the installation shown in FIG. 7, the piston 38 is made in the form of a stepped piston, one of the steps 38$d$ of which operates in a cylinder 47, to which the pressure pulse from the governor R is transmitted directly by a pipeline C.

There is thus obtained a certain acceleration effect of regulation, which effect is imparted to the speed regulation system of the motor 34. When the load increases, the pressure pulse from the governor R precedes the rise in delivery pressure, the latter being thus obtained with an increase in cyclic speed and engine compression compared with normal conditions. The converse occurs when the load of the turbine diminishes.

Furthermore, by giving to the contours of the cam 39 an appropriate form determining the value of the pressure taken from the cushion, it is possible to vary in a very favourable manner the inner dead point of the free piston or pistons as a function of the load. The control of the stabilizer is thus corrected in a particularly successful manner in the case where the characteristic pressure of the cushion acting on the stabilizer is the mean pressure of the cushion. According to a modification of this arrangement, it is possible to employ as corrective pressure, instead of the sampled pressure taken from the cushion, a pressure taken from any appropriate source, the value of which may be determined for example by means of a reduction valve regulated manually or automatically.

As already stated in the foregoing, in an installation comprising a plurality of gas-generators, the phase difference between these gas-generators corresponding to the angular distribution of the contacts 21$b$ round the rotating control member 21, the phase difference between the gas-generators may be modified by modifying said angular distribution. This modification of the phase difference is particularly useful in the case where some of the gas-generators of the installation may be temporarily stopped. For example, in an installation in which six gas-generators are operating, the phase difference between two consecutive gas-generators is preferably equal to $360°/6=60°$. If one of these gas-generators is stopped, so that only five remain in operation, it is desirable to be able so to modify the phase difference between these five gas-generators that the difference in phase between two consecutive gas-generators is equal to $360°/5=72°$. If again another gas-generator is stopped, it is useful so to modify the phase difference between the other gas-generators still working that the phase difference between two consecutive gas-generators is equal to $360°/4=90°$, and so forth.

FIGS. 8 to 12 show a device which establishes automatically, in dependence upon the number of gas-generators in operation, the optimum phase difference between the gas-generators for an installation comprising six gas-generators.

Figures 8, 9:
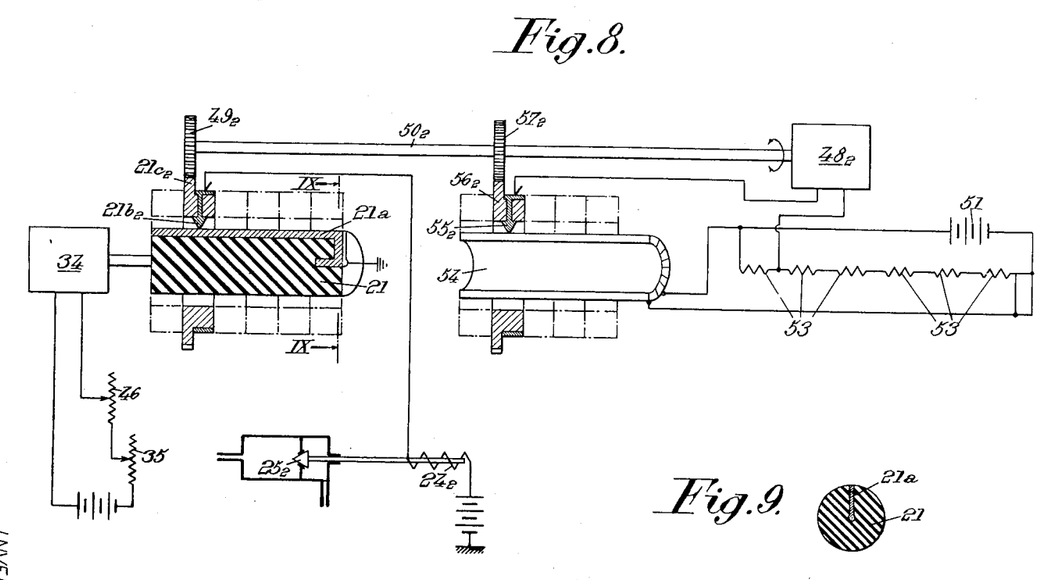
FIG. 8 shows diagrammatically a device for ensuring automatically, in an installation comprising a plurality of gas-generators, the optimum phase displacement between the gas-generators in operation, irrespective of the number of the latter.
FIG. 9 shows the control element in section on line IX—IX of FIG. 8.

According to FIG. 8, the rotating control device 21 comprises a contact strip 21$a$, the length of which is sufficient to be able to pass in front of six contacts 21$b$, fixed in axial position but capable of being adjusted angularly relatively to one another in dependence upon the number of gas-generators in operation. In FIG. 8, only one of these contacts 21$b_2$, supported by a ring 21$c_2$ is shown in section while the other annular contact supports, one of which is not required to be angularly adjustable, are merely indicated by broken lines. The contactor 21 may be set in rotation by means such as those hereinbefore described and shown in FIG. 7. Each of the contacts 21$b$ controls by means hereinabove described and shown in FIG. 1, the valve 25 of the corresponding gas-generator. Thus, the contact 21$b_2$ serves to control the valve 25$_2$ by means of a coil 24$_2$. The other valves 25 and their control means are not shown in FIG. 8.

In order to effect the angular adjustment of the various contacts 21$b$ relatively to the contactor 21, each of the annular supports 21$c$ of the five angularly movable contacts 21$b$ is connected to an electric motor 48 through the medium of a toothed wheel 49 meshing with a toothed crown of the support 21$c_2$ and through the medium of a shaft 50$_2$. It should be noted that in FIG. 8 these elements all comprise the subscript 2, in view of the fact that it concerns the means for angularly moving the support 21$c_2$ of the contact 21$b_2$.

Figure 10:
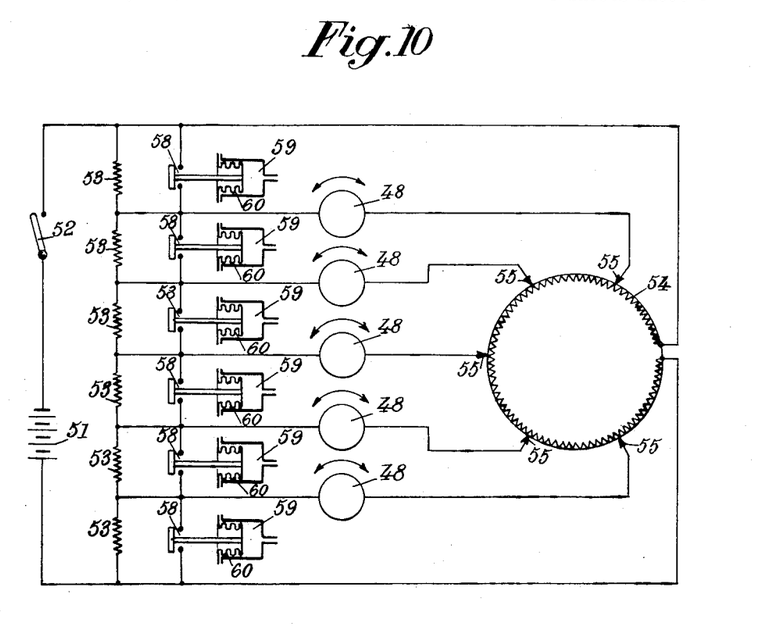
Figure 11:
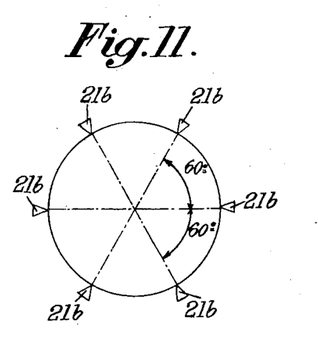
Figure 12:
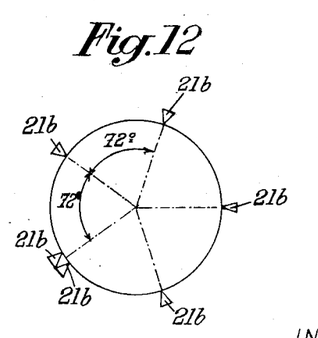

The control of the five motors 48, which may rotate in the forward direction and in the reverse direction and the object of which is always to ensure the best angular distribution of the contacts round the contactor 21, is represented diagrammatically in FIG. 10. According to this figure, the motor 48 are connected in a network fed for example by a battery 51. The circuit of this battery can be closed by a switch 52. Connected in series between the terminals of battery 51 are six fixed resistances 53 of equal value. The same voltage which is applied to these six resistances in series, is applied to a circular resistance 54, which is divided into six parts by five sliding contacts 55. Each motor 48 is connected between one of the five sliding contacts and one of the connecting points between two consecutive resistance 53. Furthermore, each motor 48 is connected mechanically to the sliding contact 55 corresponding to it, so that when the motor is under voltage, it moves by its rotation its sliding contact around the circular resistance 54. In FIG. 8, the circular resistance 54 is shown in the form of a cylinder surrounded by six rings 56, each of which comprises one of the sliding contacts 55. Each ring is secured for rotation to the corresponding motor 48 by means of a pinion 57 fixed on the shaft 50. FIG. 8 also shows the six resistances 53 and the battery 51. Finally, each resistance 53 is shunted by a switch 58 (see FIG. 10). Each of these switches corresponds to one of the gas-generators of the installations and is kept open as long as its gas-generator is in operation. In fact, while this gas-generator is in operation, its delivery pressure is transmitted to a cylinder 59, where this pressure acts on a bellows 60 or like member (piston, diaphragm or the like), which thus effects the opening of the corresponding switch 58. As soon, however, as one of the gas-generators is stopped, the corresponding switch 58 is closed and short-circuits the resistance 53 with which it is connected in parallel.

As long as the subdivision of the electrical potential by the series resistances 53 is the same as in the subdivision of the electrical resistance 54 by the sliding contacts 55, there is no electric current in the communication lines in which the motors 48 are connected. Thus, as long as the six gas-generators are in operation, the sliding contacts 55 and with them the contacts 21$b$ have the angular position indicated respectively in FIGS. 10 and 11. If, now, one of the gas-generators is stopped, the corresponding resistance 53 is short-circuited and the total electrical potential is divided by the other resistances 53 into five parts. Consequently, the motors 48 are put under voltage and move simultaneously the sliding contacts 55 and the contacts 21$b$ until the sliding contacts ensure a subdivision of the electrical resistance 54 into five equal parts, which corresponds to an angular distribution of said sliding contacts and the contacts 21$b$ according to the diagram of FIG. 12, in which two contacts 21$b$, one of which corresponds to a stopped generator, are at the same angular position.

It will be understood that the invention is not limited to the forms of application nor to the constructional forms which have been particularly described. Many modifications are possible with the scope of the invention as defined in the appended claims, particularly that in which the control member of a gas-generator is formed by another gas-generator which determines the moment at which the pulse is taken in the periodic cycle of the strokes of the free piston or pistons of the first gas-generator.

This modification is especially useful in the case where it is primarily a matter of ensuring of predetermined phase difference between these gas-generators.

Although in the embodiment described the correcting means operate electromagnetically, this is not necessarily the case. Thus, for example, they may operate hydraulically. For instance the commutator or contactor 21 may be replaced by a rotary hydraulic valve opening a number of ports in succession and applying hydraulic pressure to hydraulically operated valves which replace the electromagnetically operated valves 25. Means may be provided for moving the ports relatively to one another in order to vary the relative times of opening of the valves associated with different engines.

What I claim is:

1. An installation comprising at least one free-piston or semi-free-piston engine, said engine including a combustion cylinder, a power piston operating in said combustion cylinder, an air compressor cylinder fixed with respect to said combustion cylinder, a compressor piston rigid with said power piston and operating in said compressor cylinder, a compressed air reservoir, means for passing compressed air from said compressor cylinder to said reservoir, means including a part fixed with respect to said compressor cylinder and a movable part operatively connected with said compressor piston and adapted to cooperate with said fixed part to form therewith a variable volume air cushion, where the pressure varies periodically in accordance with the reciprocating movement of said pistons, for storing energy from said power piston during the outward stroke thereof and returning the stored energy to said pistons during the inward stroke thereof, a stabilizer having a movable element arranged to regulate by its displacements the quantity of air in said cushion, means responsive to variations of at least one internal characteristic of said engine for controlling said movable element, means for further subjecting said movable element to pressure pulses collected from said cushion at periodically recurring times and means controlled independently of the movements of said pistons for varying the phase of said pressure pulse collection times with respect to the cycle of pressure variation in said cushion to vary the operation of said stabilizer movable element.

2. An installation comprising at least one free-piston or semi-free piston engine, said engine including a combustion cylinder, a power piston operating in said combustion cylinder, an air compressor cylinder fixed with respect to said combustion cylinder, a compressor piston rigid with said power piston and operating in said compressor cylinder, a compressed air reservoir, means for passing compressed air from said compressor cylinder to said reservoir, said combustion cylinder being provided with an inlet port adapted to connect said reservoir with said cylinder at the end of the outward stroke of said power piston, means including a part fixed with respect to said compressor cylinder and a movable part operatively connected with said compressor piston and adapted to cooperate with said fixed part to form therewith a variable volume air cushion, where the pressure varies periodically in accordance with the reciprocating movement of said pistons, for storing energy from said power piston during the outward stroke thereof and returning the stored energy to said pistons during the inward stroke thereof, a stabilizer having a movable element arranged to regulate by its displacements communication in both directions between the cushion and the reservoir so as to regulate the quantity of air in said cushion, means responsive to variations of at least one internal characteristic of said engine for controlling said movable element, means for further subjecting said movable element to pressure pulses collected from said cushion at periodically recurring times and means controlled independently of the movements of said pistons for varying the phase of said pressure pulse collection times with respect to the cycle of pressure variation in said cushion to vary the operation of said stabilizer movable element.

3. An installation comprising at least one free-piston or semi-free-piston engine, said engine including a combustion cylinder, a power piston operating in said combustion cylinder, an air compressor cylinder fixed with respect to said combustion cylinder, a compressor piston rigid with said power piston and operating in said compressor cylinder, a compressed air reservoir, means for passing compressed air from said compressor cylinder to said reservoir, means including a part fixed with respect to said compressor cylinder and a movable part operatively connected with said compressor piston and adapted to cooperate with said fixed part to form therewith a variable volume air cushion, where the pressure varies periodically in accordance with the reciprocating movement of said pistons, for storing energy from said power piston during the outward stroke thereof and returning the stored energy to said pistons during the inward stroke thereof, a stabilizer having a movable element arranged to regulate by its displacements the quantity of air in said cushion, means responsive to variations of at least one internal characteristic of said engine for controlling said movable element, means for further subjecting said movable element to pressure pulses collected from said cushion at periodically recurring times and means controlled independently of the movements of said pistons for varying the phase of said pressure pulse collection times with respect to the cycle of pressure variation in said cushion to vary the operation of said stabilizer movable element, the said correcting means comprising a valve located in a pipe connecting the said cushion to the stabilizer and actuating means for periodically opening the said valve.

4. An installation comprising at least one free-piston or semi-free-piston engine, said engine including a combustion cylinder, a power piston reciprocating in said combustion cylinder, an air compressor cylinder fixed with respect to said combustion cylinder, a compressor piston rigid with said power piston and reciprocating in said compressor cylinder, a compressed air reservoir, means for passing compressed air from said compressor cylinder to said reservoir, said combustion cylinder being provided with an inlet port adapted to connect said reservoir with said cylinder at the end of the outward stroke of said power piston, means, including a part fixed with respect to said compressor cylinder and a movable part operatively connected with said compressor piston and adapted to cooperate with said fixed part to form therewith a variable volume air cushion, where the pressure varies periodically in accordance with the reciprocating movement of said pistons, for storing energy from said power piston during the outward stroke thereof and returning the stored energy to said pistons during the inward stroke thereof, a stabilizer having a movable element arranged to regulate by its displacements the quantity of air in said cushion, means for subjecting said movable element to the action of variations of the mean pressure in said cushion, to the action of variations of the pressure in said reservoir, means for subjecting said movable element to the action of pressure pulses periodically collected from said cushion, and control means for operating said last mentioned means individually of the reciprocating movement of said pistons in said cylinder.

5. An installation according to claim 1, in which said internal characteristics of operation of the engine are the mean pressure in said cushion and the pressure in said reservoir.

6. An installation according to claim 3, wherein the actuating means comprise an electromagnetic device energised periodically through an independently driven commutator.

7. An installation according to claim 3, wherein the said valve is electrically operated and wherein the actuating means comprise an electric commutator.

8. An installation according to claim 3, wherein means are provided for varying the periodicity of operation of the actuating means in dependence upon the pressure within the said reservoir.

9. An installation according to claim 3, wherein means are provided for varying the periodicity of operation of the actuating means in dependence upon the speed of a machine arranged to be driven by power gas from the engine.

References Cited in the file of this patent

UNITED STATES PATENTS

| | | |
|---|---|---|
| 2,355,924 | Pateras Pescara | Aug. 15, 1944 |
| 2,462,745 | Horgen | Feb. 22, 1949 |
| 2,701,555 | Huber | Feb. 8, 1955 |
| 2,823,653 | Dildine | Feb. 18, 1958 |

FOREIGN PATENTS

| | | |
|---|---|---|
| 556,454 | Great Britain | Oct. 6, 1943 |